(12) United States Patent
Sheng (10) Patent No.: US 10,599,027 B2
(45) Date of Patent: Mar. 24, 2020

(54) PROJECTOR WITH MULTIPLE SPATIAL LIGHT MODULATORS PRISMS AND LIGHT SOURCES

(71) Applicant: Texas Instruments Incorporated, Dallas, TX (US)

(72) Inventor: Zhongyan Sheng, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/826,298

(22) Filed: Nov. 29, 2017

(65) Prior Publication Data

US 2019/0166337 A1  May 30, 2019

(51) Int. Cl.
| | |
|---|---|
| G03B 21/20 | (2006.01) |
| H04N 9/31 | (2006.01) |
| G02B 27/14 | (2006.01) |
| G03B 21/28 | (2006.01) |
| G02B 5/04 | (2006.01) |
| G02B 27/10 | (2006.01) |

(52) U.S. Cl.
CPC .......... *G03B 21/2066* (2013.01); *G02B 5/04* (2013.01); *G02B 27/1026* (2013.01); *G02B 27/141* (2013.01); *G02B 27/149* (2013.01); *G03B 21/28* (2013.01); *H04N 9/3105* (2013.01); *H04N 9/3129* (2013.01); *H04N 9/3152* (2013.01); *H04N 9/3164* (2013.01)

(58) Field of Classification Search
CPC .. H04N 9/3164; H04N 9/3152; H04N 9/3105; H04N 9/3129; G02B 27/141; G03B 21/2066; G03B 21/28
See application file for complete search history.

(56) References Cited

U.S. PATENT DOCUMENTS

| | | | |
|---|---|---|---|
| 7,396,132 B2 | 7/2008 | Vandorpe et al. | |
| 7,576,932 B2 | 8/2009 | Vandorpe et al. | |
| 9,664,989 B2 * | 5/2017 | Bommerbach | ...... H04N 9/3158 |
| 2003/0035123 A1 * | 2/2003 | Ramanujan | .............. B41J 2/445 |
| | | | 358/1.4 |
| 2005/0088624 A1 | 4/2005 | Lee et al. | |

(Continued)

OTHER PUBLICATIONS

International Search Report for PCT/US2018/063137 dated Mar. 7, 2019.

*Primary Examiner* — Cara E Rakowski
*Assistant Examiner* — Magda Cruz
(74) *Attorney, Agent, or Firm* — Michael A. Davis, Jr.; Charles A. Brill; Frank D. Cimino (57) ABSTRACT

Described examples include a projector including a first prism having a dichroic layer. A second prism has a first spatial light modulator on a first surface, and a first light source directed through a second surface of the second prism to the first spatial light modulator. The first spatial light modulator is operable to modulate the first light to provide modulated first light that is reflected off the second surface of the second prism and the dichroic layer to projection optics. A third prism has a second spatial light modulator on a first surface and a second light source directed through a second surface to the second spatial light modulator. The second spatial light modulator is operable to modulate the second light to provide modulated second light that is reflected off the second surface of the third prism and passes through the dichroic layer to the projection optics.

20 Claims, 10 Drawing Sheets

(56) References Cited

U.S. PATENT DOCUMENTS

| | | |
|---|---|---|
| 2007/0252957 A1 | 11/2007 | Penn |
| 2007/0296921 A1 | 12/2007 | Wang et al. |
| 2008/0192205 A1* | 8/2008 | De Vaan .............. G02F 1/13362 353/20 |
| 2014/0340650 A1* | 11/2014 | Davis .................... H04N 9/315 353/33 |
| 2015/0077419 A1 | 3/2015 | Abuelsaad et al. |
| 2015/0138446 A1 | 5/2015 | Sheng |
| 2015/0271380 A1* | 9/2015 | Darty .................... G01J 3/0294 348/342 |
| 2016/0299417 A1* | 10/2016 | Lambot .............. G02B 27/1026 |

* cited by examiner

PROJECTOR WITH MULTIPLE SPATIAL LIGHT MODULATORS PRISMS AND LIGHT SOURCES

TECHNICAL FIELD

This relates generally to projectors, and, in particular examples, to multi-modulator projectors.

BACKGROUND

Spatial light modulators (SLMs) are light modulation devices used in the projector industry. An example of an SLM is a digital micromirror device (DMD). A surface of an SLM includes thousands or hundreds of thousands of picture elements (pixels). With a DMD, the picture elements are mirrors. Light illuminates the mirrors and physical modulation of the mirrors generates the desired image. Projection optics projects the light reflected from the SLM. Using techniques such as color wheels, multiple light sources and modulation of the mirrors, SLM-based projectors can project a full color image. This is referred to as a single modulator or "single chip" projector. However, this type of system can only project one color at a time. Transitions from one color to another can create unwanted artifacts and can cause discomfort in sensitive people. A three modulator ("three chip") projector uses SLMs dedicated to each projected color, often red, green and blue. This type of projector avoids artifacts cause by color transitions. However, the optics necessary to combine the three images from the three SLMs are large, complex and expensive.

SUMMARY

In accordance with an example, a projector includes a first prism having a dichroic layer to reflect light having a first color and a second prism having a first spatial light modulator on a first surface of the second prism. The projector also includes a first light source to provide a first light having the first color directed through a second surface of the second prism to the first spatial light modulator, the first spatial light modulator operable to modulate the first light to provide modulated first light that is reflected off the second surface of the second prism and the dichroic layer of the first prism to projection optics. The projector also includes a third prism having a second spatial light modulator on a first surface of the third prism and a second light source to provide a second light of a second color directed through a second surface of the third prism to the second spatial light modulator, the second spatial light modulator operable to modulate the second light to provide modulated second light that is reflected off the second surface of the third prism and passes through the dichroic layer of the first prism to the projection optics.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1A:
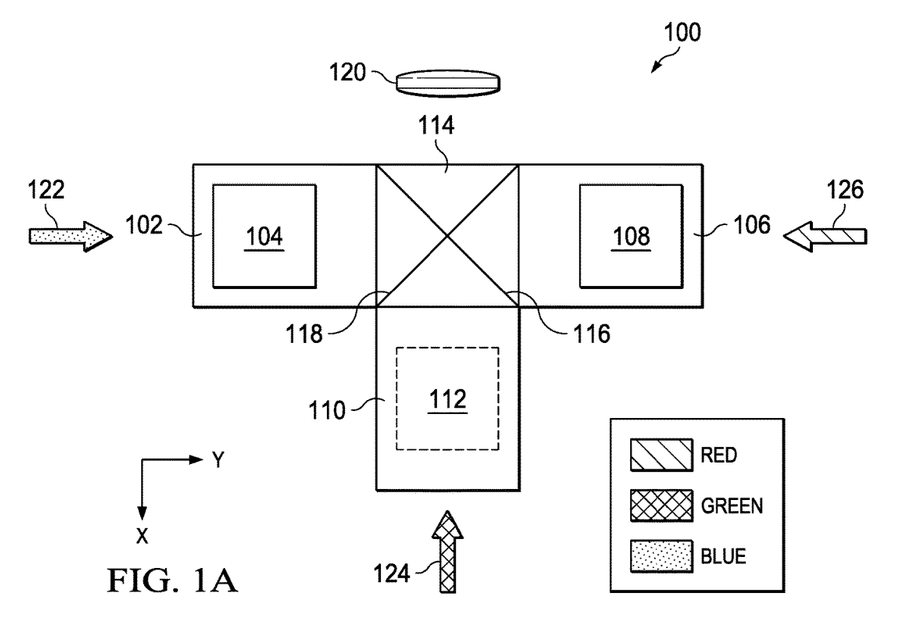
FIGS. 1A, 1B and 1C (collectively "FIG. 1") are top, back and side views, respectively, of an example projector.
Figure 1B:
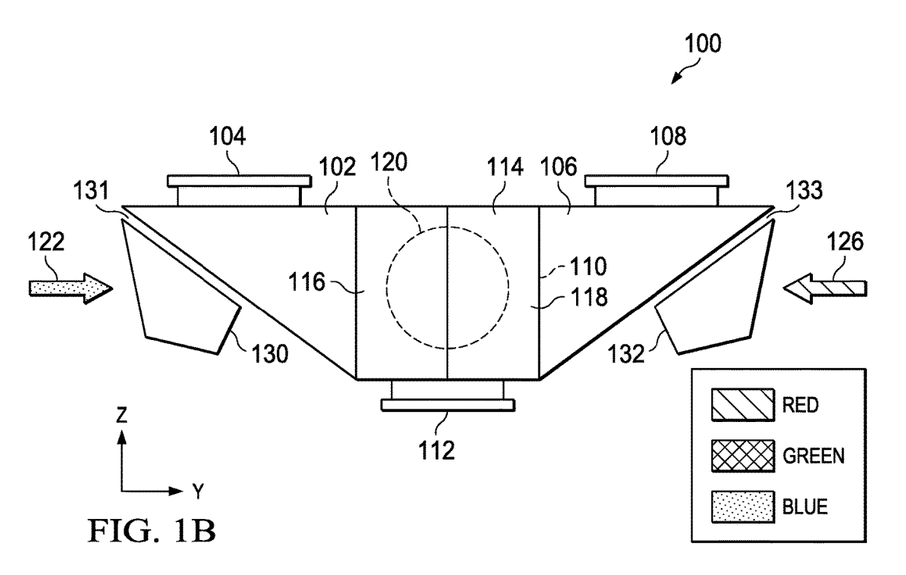
Figure 1C:
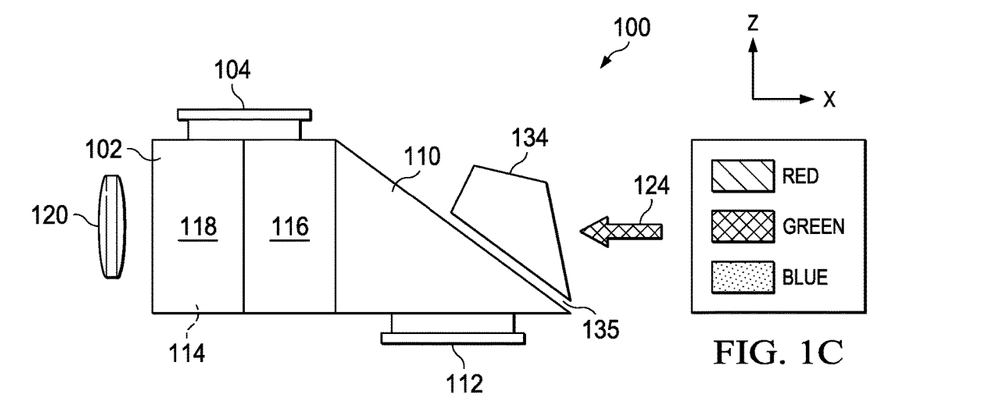

FIGS. 1A, 1B and 1C (collectively "FIG. 1") are top, back and side views, respectively, of an example projector 100. The label "top view" as applied to FIG. 1A is arbitrary and only provides a frame of reference. The labels "top," bottom," "front" and "back" are arbitrary and only used herein for clarity of explanation. Projector 100 is operable in any orientation. In addition, a cartesian reference in the top left corner of each of FIGS. 1A, 1B and 1C provides relative orientation for these figures. SLM 104 is on a surface of prism 102. SLM 108 is on a surface of prism 106. SLM 112 is on a surface of prism 110. FIG. 1A shows SLM 112 in dashes because, in this example, SLM 112 is on the bottom surface of prism 110 and thus is opposite the view of FIG. 1A. X-prism 114 includes dichroic layers 116 and 118. Dichroic layers 116 and 118 extend from corner to opposing corner in the view of FIG. 1A and thus form an X in the view of FIG. 1A. In examples, prisms 102, 106 and 110 and X-prism 114 are glass or optical grade plastics. As more fully explained herein below, light modulated by SLMs 104, 108 and 110 combines in X-prism 114 and projects through projection optics 120. FIG. 1A shows projection optics 120 as a single lens for clarity. As used herein, the term "projection optics" includes a single lens or includes multiple lenses and apertures. In an example, "projection optics" includes zooming and/or focusing mechanisms. As more fully explained hereinbelow, in an example, SLM 104 modulates blue light source 122, SLM 112 modulates green light source 124 and SLM 108 modulates red light source 126. Red, Green and Blue (RGB) is one example combination of colors that can provide a full color gamut. Other combinations of colors in other examples can provide the colors necessary for the full image.

FIG. 1B is a back view of example projector 100. The viewpoint of FIG. 1B is opposite projection lens 120. Convention normally labels the direction of projection of the image the "front" of the projector. In the view of FIG. 1B, prisms 102 and 106 have a triangular shape. SLM 104 is on one surface of prism 102. At the opposing, angled surface of prism 102, air gap 131 separates folding prism 130 from prism 102. SLM 108 is on one surface of prism 106. At the opposing, angled surface of prism 106, air gap 133 separates folding prism 132 from prism 106. Prism 110 extends outward from FIG. 1B, but is in an inverted position relative to prisms 102 and 106, as is more fully explained regarding FIG. 1C.

FIG. 1C is a side view of an example projector 100. FIG. 1B omits folding prism 134 and FIG. 1C omits folding prism 130 for clarity. In this example projector, SLM 112 is on the bottom of projector 100 as shown in FIG. 1B while the other SLMs, such as SLM 104 are on the top of projector 100. This positioning of the SLMs is not necessary to the operation of projector 100. For example, flipping prism 110 allows SLM 112 to be on the top of projector 100. However, placing at least one of the SLMs on the opposing side from the other SLMs allows for more room for wiring, cooling and other interconnections to the SLMs. Air gap 135 separates folding prism 134 from prism 110. Air gap 135 and air gaps 131 and 133 provide a refractive index differential between the air and the respective prisms adjacent the air gaps. The operational significance of the refractive index differential is further explained hereinbelow.

The surfaces of the prisms on either side of air gaps 131, 133 and 135 provide the capability of total internal reflection (TIR) of light. Briefly, light reflects off a boundary between two materials having different refractive indexes when the light strikes the boundary at greater than a critical angle. The critical angle is the angle of incidence for which the angle of refraction is 90°. The angle of incidence is an angle from a normal to the refractive boundary. With a light ray passing from glass into air, the light emanating from the interface bends towards the glass. When the incident angle ($\theta_i$) increases sufficiently, such that the transmitted angle ($\theta_t$) reaches 90 degrees, no light transmits into the air. That is, the transmitted light totally reflects. Snell's Law determines the critical angle $\theta_c$. Equation (1) states Snell's Law.

$$n_1 \sin \theta_i = n_2 \sin \theta_t \quad (1)$$

Where $n_1$ is the refraction index of the glass and $n_2$ is the refraction index of the air (1).

Equation (2) is an algebraic rearrangement of Equation (1).

$$\sin\theta_i = \frac{n_2}{n_1}\sin\theta_t \quad (2)$$

To find the critical angle, we find the value for $\theta_i$ when $\theta_t=90$ and thus $\sin \theta_t=1$. Solving for $\theta_c$ yields Equation (3), which is the equation for the critical angle:

$$\theta_c = \arcsin\frac{n_2}{n_1} \quad (3)$$

Figure 2:
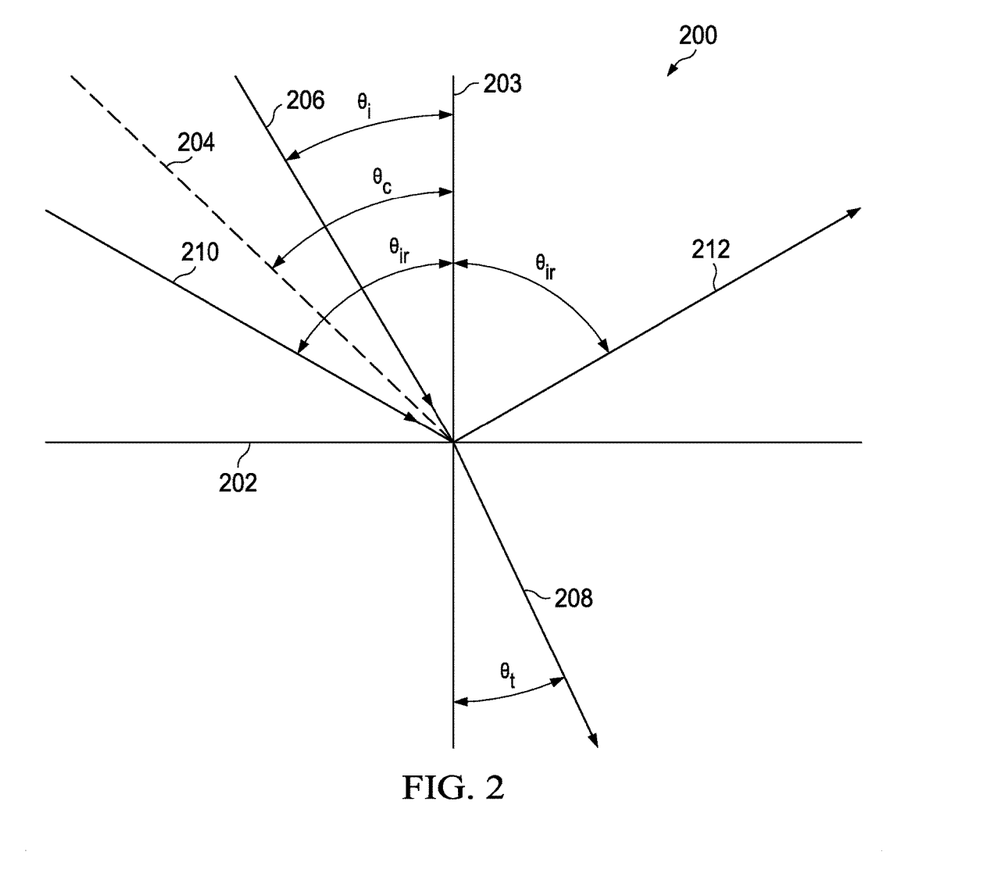
FIG. 2 is a graphical representation of the principles of total internal reflection.

FIG. 2 is a graphical representation of these principles. Chart 200 shows a boundary 202 that is a boundary between two materials having different refractive indexes. Perpendicular 203 determines the angles of Equations (1), (2) and (3). Critical angle 204 is an angle $\theta_c$ from perpendicular 203. Light 206 strikes boundary 202 at an angle $\theta_i$ that is less than angle $\theta_c$. Therefore, light ray 206 will pass through boundary 202 as light 208 having an angle $\theta_t$ relative to perpendicular 203, where Equation (1) determines angle $\theta_t$. Conversely, light 210 strikes boundary 202 at an angle $\theta_i$, greater than critical angle 204. Therefore, light 210 reflects off boundary 202 as light 212.

Figures 3, 4, 5:
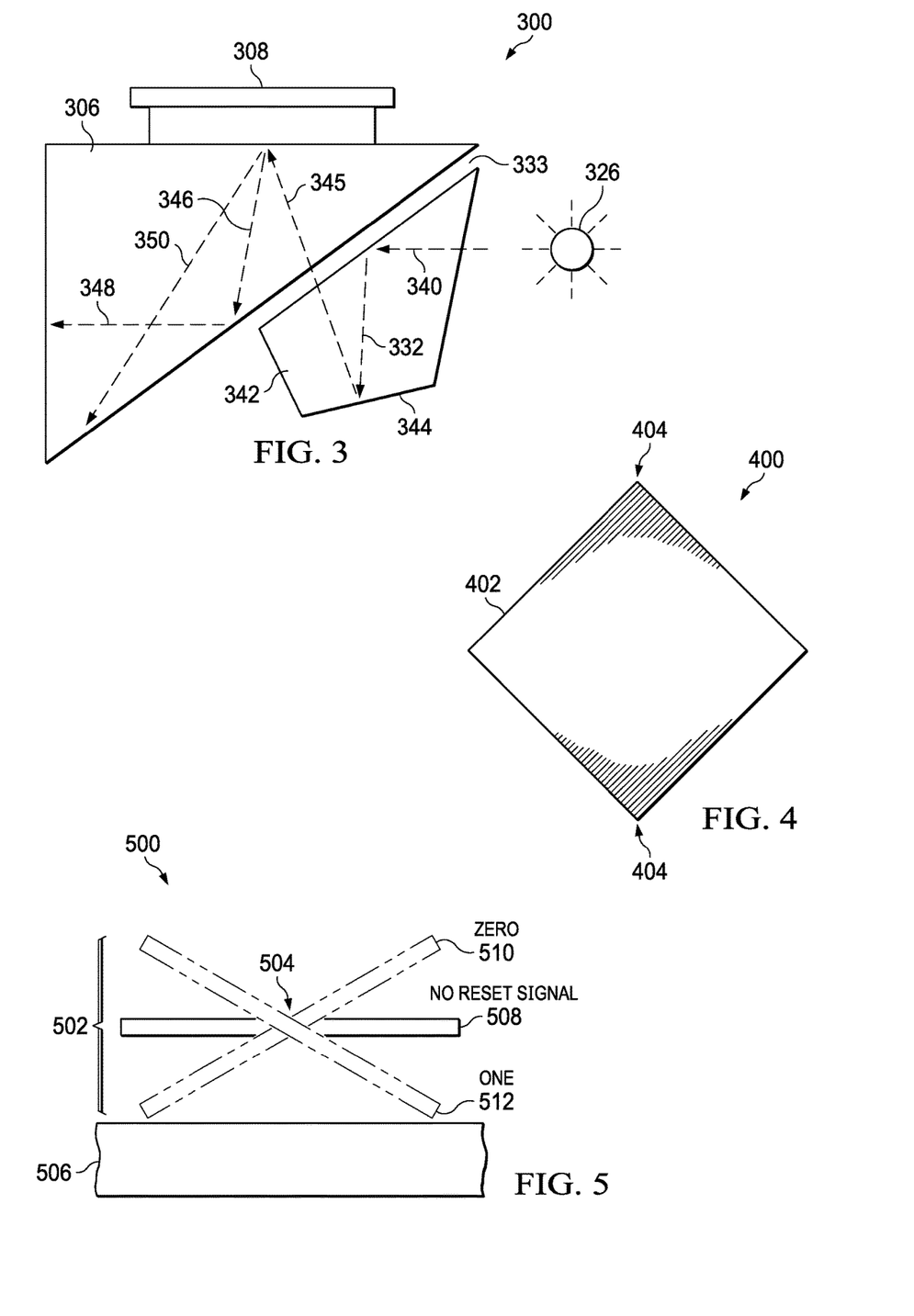
FIG. 3 is a schematic diagram showing the path of light through an example arrangement.
FIG. 4 is a view of one mirror of a DMD as seen from the reflecting surface of the DMD.
FIG. 5 is a side view of a mirror like that of FIG. 4.

FIG. 3 is a schematic diagram showing the path of light through an example arrangement. SLM 308, prism 306, folding prism 342 and air gap 333 are like SLM 108, prism 106, folding prism 132 and air gap 133 of FIG. 1, respectively. FIG. 3 shows one prism/SLM group for clarity. The operation of prism group 300 is like the operation of the group including SLM 104, prism 102 and folding prism 130 (FIG. 1), and is also like the operation of the group including SLM 112, prism 110 and folding prism 134 (FIG. 1). In prism group 300, light source 326 provides collimated light 340. Example light sources include a laser, a light emitting diode, a laser excited phosphor or other light source. Lenses, light tubes, lens arrays and other light conditioning mechanisms can condition the light from those sources to provide light source 326.

The different refraction indexes of air gap 333 and folding prism 342 creates a boundary. The angle that light 340 strikes the boundary is greater than the critical angle, so light 340 reflects by TIR to provide light 332. A reflective layer coats surface 344 of folding prism 342 so light 332 reflects off surface 344. The reflective layer is, for example, a deposited metal. In the example of FIG. 3, surface 344 is flat. However, in other examples, surface 344 may have a curvature to condition or focus light 332 as reflected light 345. Surface 344 may have a concave shape or may have an asymmetric profile to correct light 332. Light 345 passes through the air gap 333 because it has an angle of incidence less than the critical angle. Any refraction at the boundary between prism 342 and the air gap is the opposite and equal of the refraction between air gap 333 and prism 306. Therefore, FIG. 3 depicts light 345 as passing straight through air gap 333 for simplicity.

As shown in FIG. 3, light 345 may reflect at more than one angle from the surface of SLM 308. That is, each pixel may reflect as light 346 or light 350. In this example, SLM 308 is a DMD. As explained further hereinbelow regarding FIGS. 4 and 5, each pixel of SLM 308 can tilt based on image data loaded into SLM 308 so that SLM 308 modulates the light reflected from the surface of SLM 308 to provide the desired image for the color of light provided by light source 326. When a pixel is "ON," light 345 reflects off SLM 308 to light 346. Light 346 then reflects off the angled surface of prism 306 by TIR to provide light 348, which combines in X-prism 114 (FIG. 1) with modulated light of other colors provided by other prism groups, as explained further hereinbelow. On the other hand, when a pixel is "OFF," light 345 reflects to light 350. Light 350 also reflects off the lower surface of prism 306 by TIR, but does so at such an angle that this light does not combine in X-prism 114 (FIG. 1), but rather exits as waste light from one of the surfaces of X-prism 114 (FIG. 1) that is perpendicular to the X formed by dichroic layers 116 and 118. In an example, light traps (not shown) capture light 350 after it exits X-prism 114 (FIG. 1) so that light 350 does not interfere with the projected image. In other examples, other types of spatial light modulators can include liquid crystal display (LCD) or liquid crystal on silicon (LCOS) SLMs. Because those types of SLMs simply reflect the "ON" pixels and either capture or pass the "OFF" pixels, the angle of reflection between light 345 and 346 will be that same. Therefore, prism 306 must have a slightly different geometry with these other types of SLMs.

FIG. 4 is a view of one mirror of a DMD like SLM 308 (FIG. 3) as seen from the reflecting surface of the DMD. View 400 shows mirror 402. Mirror 402, in this example, has a square configuration with pivot points 404 at opposing corners of mirror 402.

FIG. 5 is a side view of a mirror like that of mirror 402 (FIG. 4). View 500 shows mirror 502. Pivot points 504 are at the corner of mirror 502 like pivot points 404 of FIG. 4. Pivot connections (not shown) suspend mirror 502 from substrate 506 by pivot points 504. To change the state of mirror 502, a memory cell (not shown) associated with mirror 502 receives a data bit of one (ON) or zero (OFF). After loading the data bit into the memory cell, a reset signal applied to the entire DMD or to reset groups on the DMD causes mirror 502 to take the zero position 510 or the one position 512 using, for example, electrostatic force. With no reset signal, mirror 502 is parallel to the surface of substrate 506 at no reset signal position 508. In one of these three positions, for example the ON position 512, light 345 reflects to light 346 (FIG. 3). In another position, for example the OFF position 510, light 345 reflects to light 350 (FIG. 3). A DMD can contain many mirrors like mirror 502. For example, a DMD configured for high definition (HD) television includes 1920×1080 or over two million mirrors.

Figures 6, 7A, 7B, 7C:
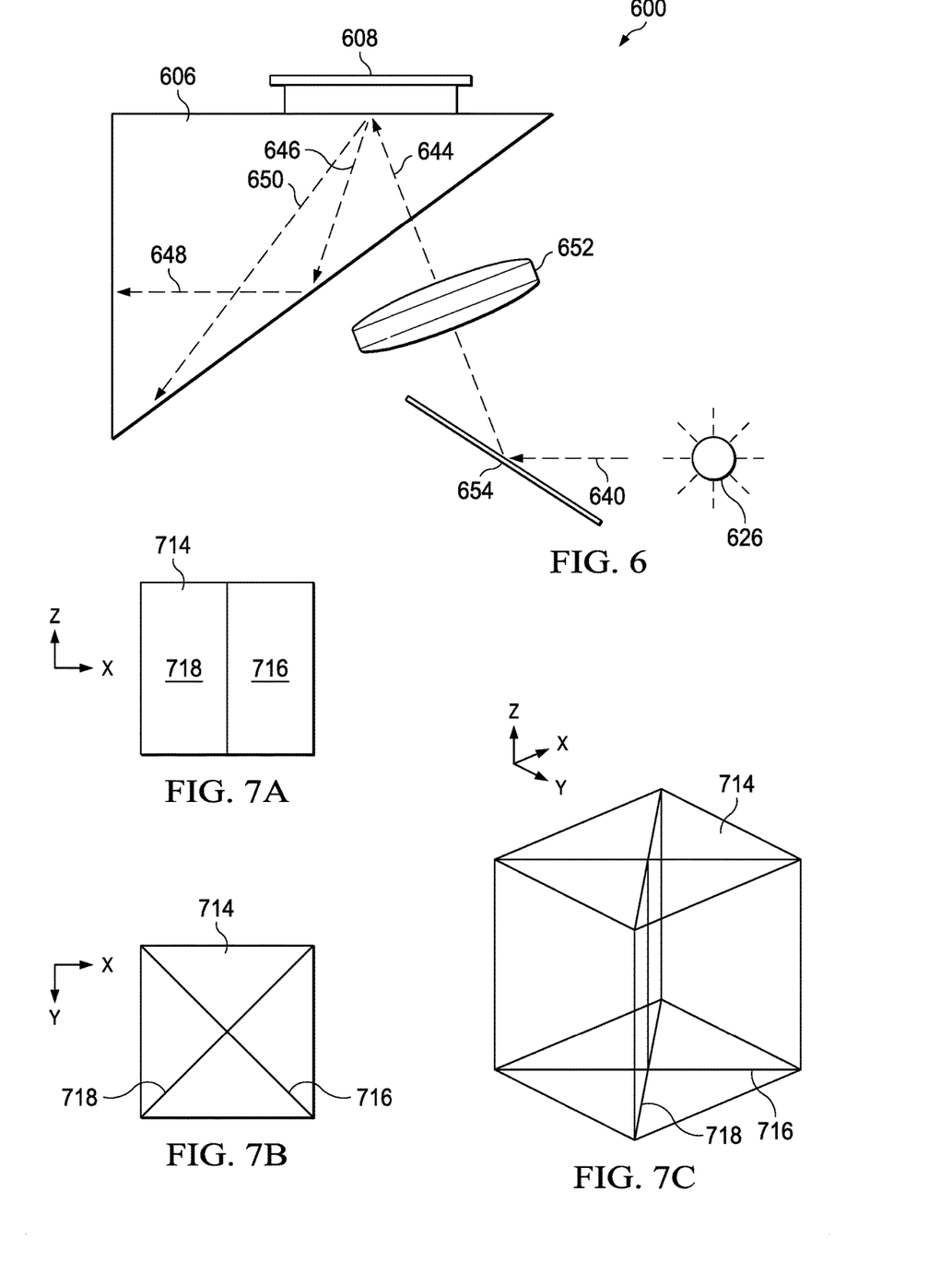
FIG. 6 is a schematic drawing of another example prism.
FIGS. 7A, 7B and 7C (collectively "FIG. 7") are front, top and perspective views of an example X-prism.

FIG. 6 is a schematic drawing of another example prism. Rather than a folding prism, prism group 600 uses a mirror 654 to reflect light 640 at the needed angle to provide light 644. Lens 652 can condition or focus light 644. In an example, lens 652 is one lens, a group of lenses or a combination of lenses and other optical mechanisms. Light source 626, light 646, light 650, light 648, SLM 608 and prism 606 are like light source 326, light 346, light 350, light 348, SLM 308 and prism 306 of FIG. 3, respectively.

FIGS. 7A, 7B and 7C (collectively "FIG. 7") are front, top and perspective views of an example X-prism like X-prism 714. X-prism 714 is like X-prism 114 of FIG. 1. FIG. 7A shows half of dichroic layer 716 and half of dichroic layer 718. This view hides the other halves of these dichroic layers from where they cross each other. FIG. 7B is a top view that more clearly shows that dichroic layer 716 and dichroic layer 718 cross in the center of X-prism 714. The top profile of X-prism 714 is square in this example. In addition, dichroic layer 716 and dichroic layer 718 extend from one corner of that square to the opposite corner. Therefore, dichroic layer 716 and dichroic layer 718 are at a 45° angle from any of the sides of X-prism 714. FIG. 7C is a perspective view that shows the positions of dichroic layer 716 and dichroic layer 718 within X-prism 714.

Figure 8:
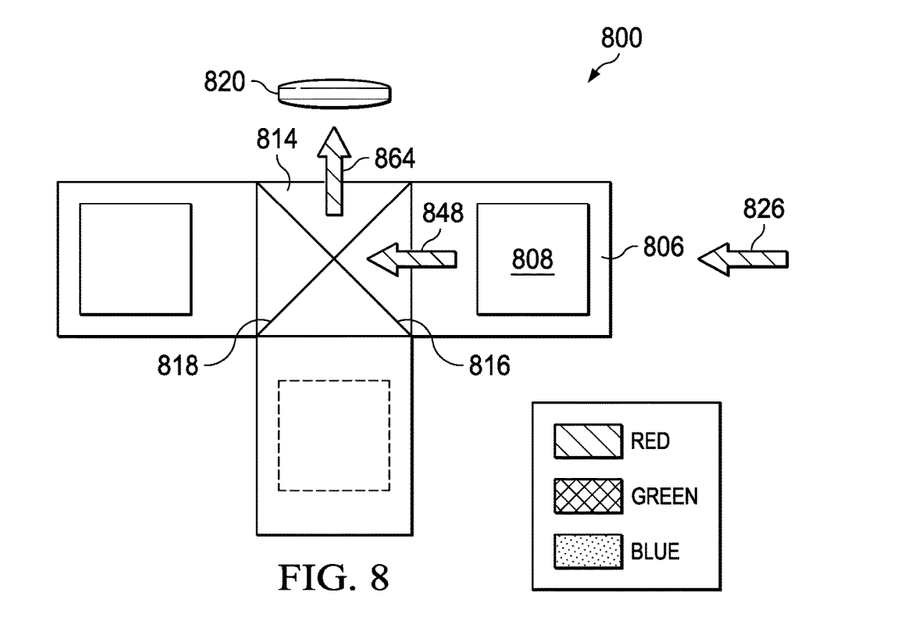
FIG. 8 is a schematic diagram showing the flow of red light through an example projector.

FIG. 8 is a schematic diagram showing the flow of red light through an example projector. Projector 800 is like projector 100 of FIG. 1. Red light source 826, SLM 808, projection optics 820 and prism 806 are like red light source 126, SLM 108, projection optics 120 and prism 106 of FIG. 1, respectively. Light 848 is like light 348 of FIG. 3. That is, light 848 is red color light modulated by SLM 808. Dichroic layer 816 in X-prism 814 reflects only red light and allows light of other colors to pass. Therefore, light 848 reflects off dichroic layer 816 as light 864 to projection optics 820. Conversely, dichroic layer 818 of X-prism 814 only reflects blue light. Therefore, light 848 passes through dichroic layer 818 wherever it encounters dichroic layer 818 and only reflects off dichroic layer 816.

Figure 9:
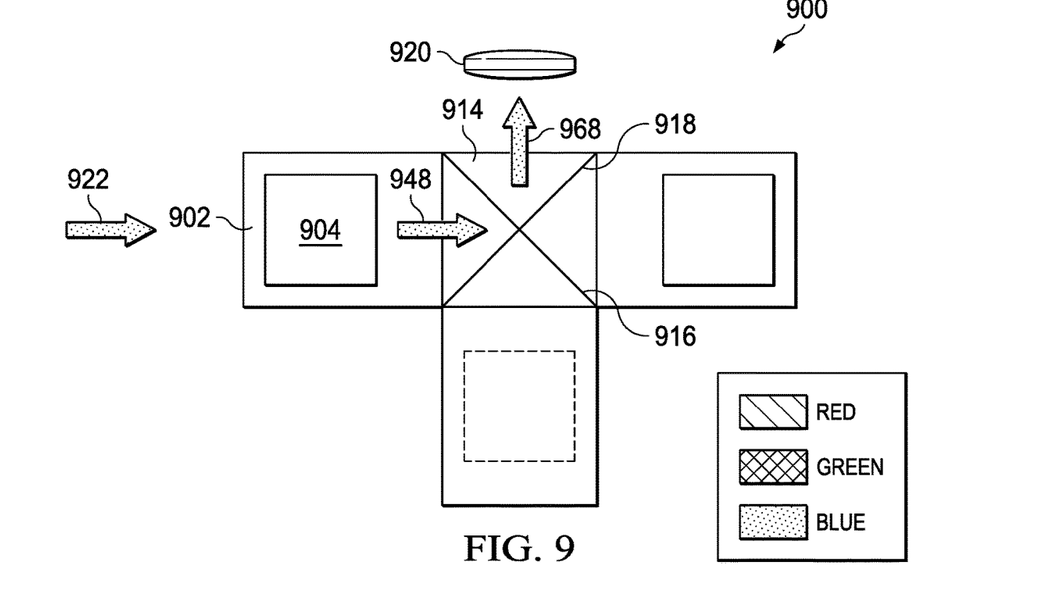
FIG. 9 is a schematic diagram showing the flow of blue light through an example projector.

FIG. 9 is a schematic diagram showing the flow of blue light through an example projector. Projector 900 is like projector 100 of FIG. 1. Blue light source 922, SLM 904, projection optics 920 and prism 902 are like blue light source 122, SLM 104, projection optics 120 and prism 102 of FIG. 1, respectively. Light 948 is like light 348 of FIG. 3. That is, light 948 is blue light modulated by SLM 904. Dichroic layer 918 in X-prism 914 reflects only blue light and allows light of other colors to pass. Therefore, light 948 reflects off dichroic layer 918 as light 968 to projection optics 920. Conversely, dichroic layer 916 of X-prism 914 only reflects red light. Therefore, light 948 passes through dichroic layer 916 wherever it encounters dichroic layer 916 and only reflects off dichroic layer 918.

Figure 10:
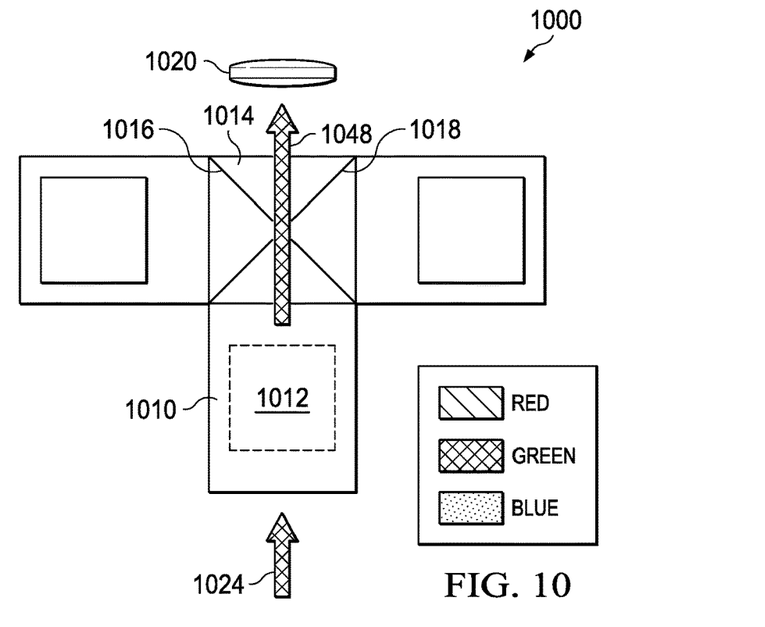
FIG. 10 is a schematic diagram showing the flow of green light through an example projector.

FIG. 10 is a schematic diagram showing the flow of green light through an example projector. Projector 1000 is like projector 100 of FIG. 1. Green light source 1024, SLM 1012, projection optics 1020 and prism 1010 are like green light source 124, SLM 112, projection optics 120 and prism 110 of FIG. 1, respectively. Light 1048 is like light 348 of FIG. 3. That is, light 1048 is green light modulated by SLM 1012. Dichroic layer 1018 in X-prism 1014 reflects only blue light and allows light of other colors to pass. Dichroic layer 1016 of X-prism 1014 only reflects red light. Therefore, light 1048 passes through both dichroic layer 1016 and dichroic layer 1018 and passes through to projection optics 1020. Thus, by combining the light paths of FIGS. 8-10, modulated red light 848, modulated blue light 948 and modulated green light 1048 combine in X-prism 814/914/1014 and projection optics 820/920/1020 (which are like projection optics 120 of FIG. 1) projects the combined modulated light as the image. Therefore, the compact and relatively inexpensive arrangement of projector 800/900/1000 (which are like projector 100 of FIG. 1) provides a complete RGB full color image.

Figure 11:
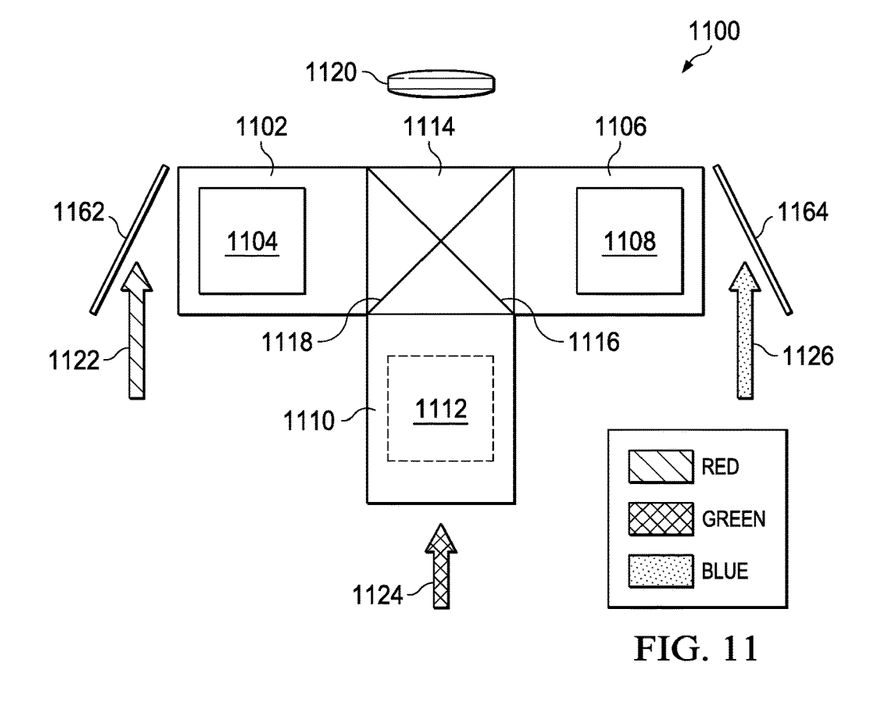
FIG. 11 is an example projector including a light source arrangement.

FIG. 11 is an example projector including a light source arrangement. In projector 1100, prisms 1102, 1106 and 1110, SLMs 1104, 1108 and 1112, X-prism 1114, dichroic layers 1116 and 1118, and projection optics 1120 are like prisms 102, 106 and 110, SLMs 104, 108 and 112, X-prism 114, dichroic layers 116 and 118, and projection optics 120 of projector 100 of FIG. 1, respectively. Green light source 1124 provides green light to prism 1110 that SLM 1112 modulates. To provide a more compact device, red light source 1122 reflects off mirror 1162 at an angle of 90° to provide red light to prism 1102 that SLM 1104 modulates. Similarly, to provide a more compact device, blue light source 1126 reflects off mirror 1164 at an angle of 90° to provide blue light to prism 1106 that SLM 1108 modulates.

Figure 12:
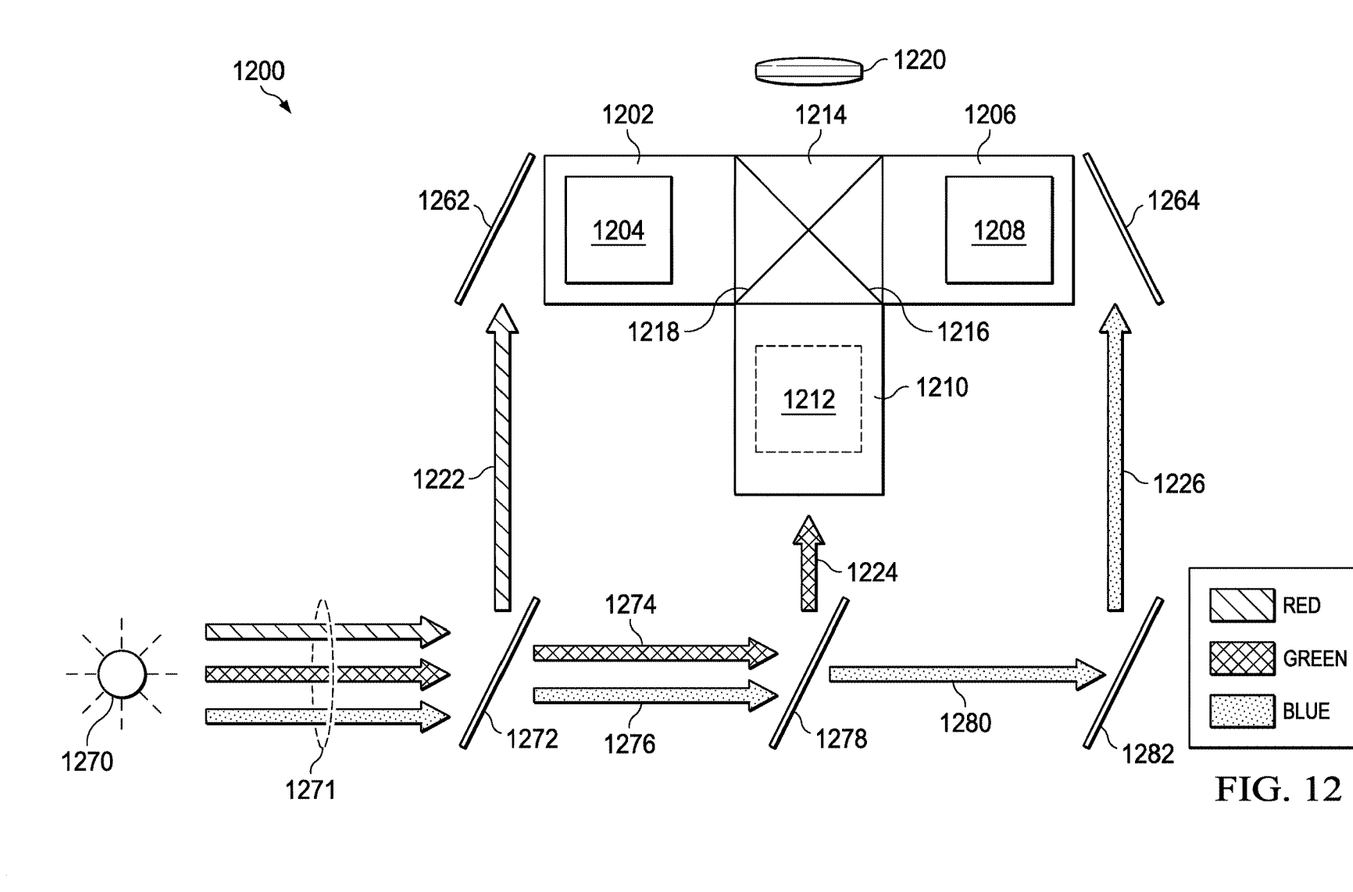
FIG. 12 is another example projector including a light source arrangement.

FIG. 12 is another example projector including a light source arrangement. In projector 1200, prisms 1202, 1206 and 1210, SLMs 1204, 1208 and 1212, X-prism 1214, dichroic layers 1216 and 1218, and projection optics 1220 are like prisms 102, 106 and 110, SLMs 104, 108 and 112, X-prism 114, dichroic layers 116 and 118, and projection optics 120 of projector 100 of FIG. 1, respectively. Light source 1270 provides light 1271. Light source 1270 is, for example, one full-spectrum white light source or, in another example, a set of red, green and blue light sources. Light source 1270 impacts dichroic mirror 1272. Dichroic mirror 1272 reflects red light, so the red light from light source 1270 reflects to red light 1222. Red light 1222 reflects off mirror 1262 at an angle of 90° to provide red light to prism 1202 that SLM 1204 modulates. Green light 1274 and blue light 1276 pass through dichroic mirror 1272 and impact dichroic mirror 1278. Dichroic mirror 1278 reflects only green light, so green light 1274 reflects off mirror 1278 to provide green light 1224. Green light 1224 provides green light to prism 1210 that SLM 1212 modulates. Blue light 1276 passes through dichroic mirror 1278 to provide blue light 1280, which reflects off mirror 1282 (which can be a dichroic mirror to reduce any leakage of red or green light) to provide light 1226. Blue light 1226 reflects off mirror 1264 at an angle of 90° to provide blue light to prism 1206 that SLM 1208 modulates. Therefore, projector 1200 provides a compact arrangement with a single or bundled light source.

Figure 13:
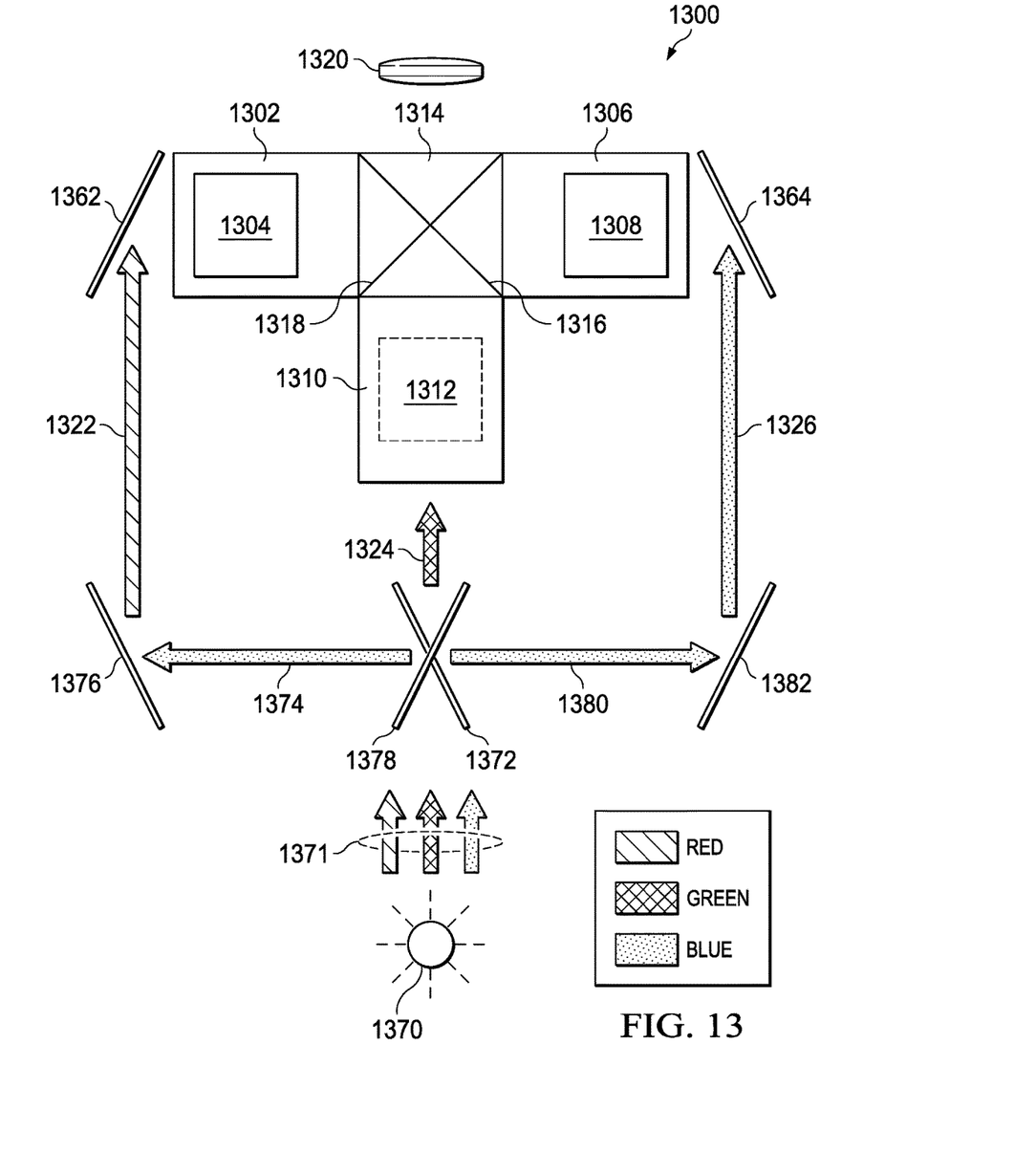
FIG. 13 is another example projector including a light source arrangement.

FIG. 13 is another example projector including a light source arrangement. In projector 1300, prisms 1302, 1306 and 1310, SLMs 1304, 1308 and 1312, X-prism 1314, dichroic layers 1316 and 1318, and projection optics 1320 are like prisms 102, 106 and 110, SLMs 104, 108 and 112, X-prism 114, dichroic layers 116 and 118, and projection optics 120 of projector 100 of FIG. 1, respectively. Light source 1370 provides light 1371. Light source 1370 is, for example, one full-spectrum white light source or, in another example, a set of red, green and blue light sources. Light source 1370 impacts dichroic mirror 1372. Dichroic mirror 1372 reflects red light, so the red light from light source 1370 reflects off dichroic mirror 1372 to red light 1374, which reflects off mirror 1376 (which can be a dichroic mirror to reduce any leakage of blue or green light) to provide red light source 1322. Red light source 1322 reflects off mirror 1362 at an angle of 90° to provide red light to prism 1302 that SLM 1304 modulates. Light source 1370 also impacts dichroic mirror 1378. Dichroic mirror 1378 reflects blue light, so the blue light from light source 1370 reflects off dichroic mirror 1378 to blue light 1380, which reflects off mirror 1382 (which can be a dichroic mirror to reduce any leakage of red or green light) to provide blue light 1326. Blue light 1326 reflects off mirror 1364 at an angle of 90° to provide blue light to prism 1306 that SLM 1308 modulates. Because red and blue light is reflected by dichroic mirrors 1372 and 1378, respectively, the remaining portion of light source 1370 is green light 1324. Green light 1324 provides green light to prism 1310 that SLM 1312 modulates. Therefore, projector 1300 provides another compact arrangement with a single or bundled light source. In another example, dichroic mirrors 1372 and 1378 are in an X-prism (not shown) like X-prism 1314.

Figure 14:
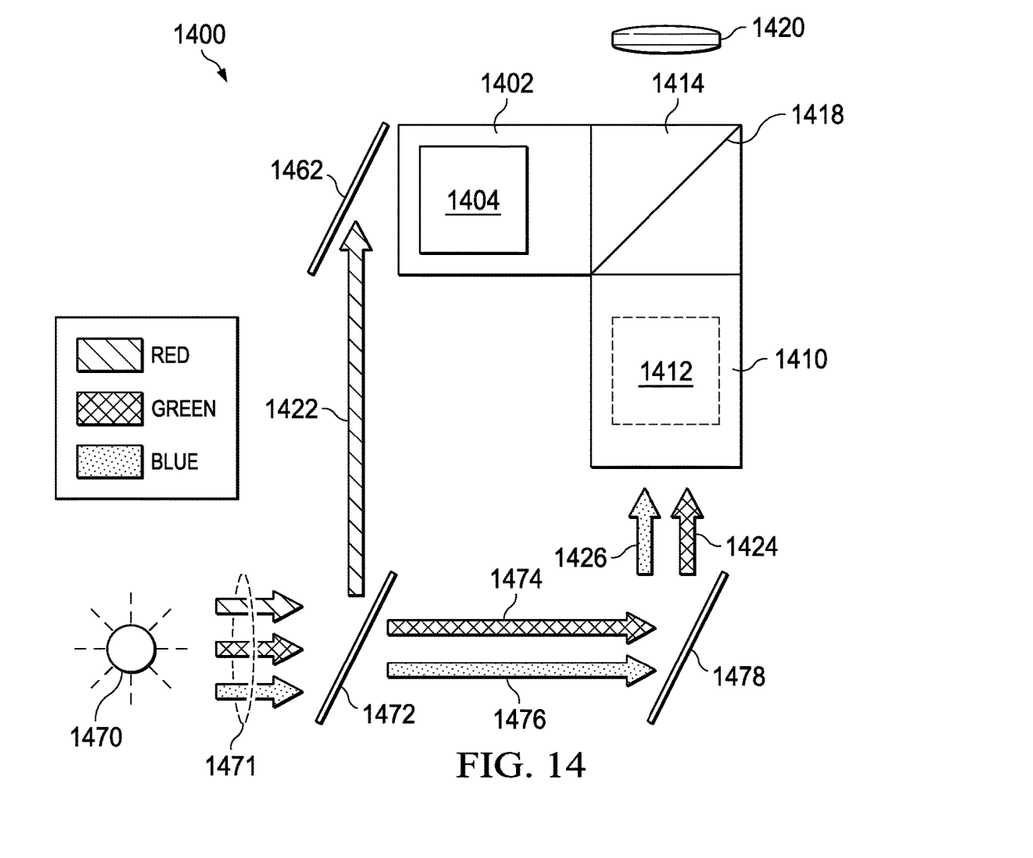
FIG. 14 is another example projector.

FIG. 14 is another example projector. In projector 1400, prisms 1402 and 1410, SLMs 1404 and 1412, X-prism 1414, dichroic layer 1418, and projection optics 1420 are like prisms 102 and 110, SLMs 104 and 112, X-prism 114, dichroic layer 118, and projection optics 120 of projector 100 of FIG. 1, respectively. Light source 1470 provides light 1471. Light source 1470 is, for example, one full-spectrum white light source or, in another example, a set of red, green and blue light sources. Light source 1470 impacts dichroic mirror 1472. Dichroic mirror 1472 reflects red light, so the red light from light source 1470 reflects off dichroic mirror 1472 to red light 1422. Red light 1422 reflects off mirror 1462 at an angle of 90° to provide red light to prism 1402 that SLM 1404 modulates. Light source 1370 also impacts mirror 1478. Mirror 1478 reflects the remaining green light 1474 and blue light 1476 to green light 1424 and blue light 1426. Green light 1424 and blue light 1426 provide light to prism 1410 that SLM 1412 modulates. Therefore, projector 1300 provides another compact arrangement with a single or bundled light source. In an example, light source 1470 alternates providing blue and green light using separate blue and green light sources. SLM 1412 then modulates green light when light source 1370 provides green light and SLM 1412 modulates blue light when light source 1370 provides blue light. In an alternative example, a color wheel (not shown) is used to separate in time either green light 1474 and blue light or green light 1424 and blue light 1426.

Figure 15:
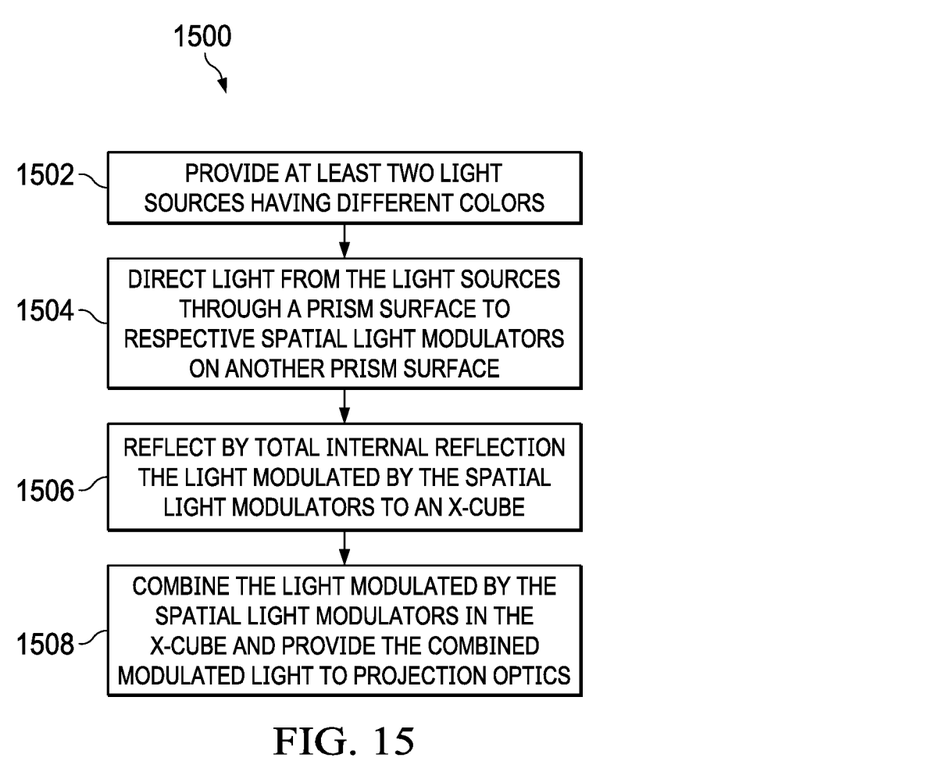
FIG. 15 is a flow diagram of an example method.

FIG. 15 is a flow diagram of an example method 1500. Step 1502 provides at least two light sources having different colors. Step 1504 directs the light sources through surfaces of respective prisms to respective spatial light modulators on another prism surface. Step 1506 reflects the light modulated by the spatial light modulators off the surfaces of the respective prisms to an X-prism. Step 1508 combines the modulated light reflected off the surfaces of the respective prisms and provides the combined modulated light to projection optics.

Modifications are possible in the described examples, and other examples are possible, within the scope of the claims.

What is claimed is:

1. A projector comprising:
    projection optics;
    a first prism having a dichroic layer;
    a second prism having first and second surfaces;
    a first spatial light modulator on the first surface, the first spatial light modulator facing in a first direction;
    a first light source optically coupled to the second surface, the first light source configured to provide a first light having a first color along a first illumination path in a plane through the second surface to the first spatial light modulator, the first spatial light modulator configured to modulate the first light, the second surface configured to reflect the modulated first light from the first spatial light modulator, and the dichroic layer configured to reflect the modulated first light from the second surface to the projection optics along a projection light path in the plane;
    a third prism having third and fourth surfaces;
    a second spatial light modulator on the third surface, the second spatial light modulator facing in a second direction opposite the first direction; and
    a second light source optically coupled to the fourth surface, the second light source configured to provide a second light having a second color along a second illumination path in the plane through the fourth surface to the second spatial light modulator, the second spatial light modulator configured to modulate the second light, the fourth surface configured to reflect the modulated second light from the second spatial light modulator, and the dichroic layer configured to pass the modulated second light from the fourth surface to the projection optics.

2. The projector of claim 1, further comprising a first folding prism optically coupled to receive the first light from the first light source and to direct the first light through the second surface.

3. The projector of claim 1, wherein the first spatial light modulator is a digital micromirror device.

4. The projector of claim 1, wherein the second surface is configured to reflect the modulated first light by total internal reflection.

5. The projector of claim 1, wherein the first prism, the second prism and the third prism are glass.

6. The projector of claim 1, wherein the first color is red.

7. The projector of claim 1 wherein the dichroic layer is a first dichroic layer, the first prism has a second dichroic layer, and the projector further comprises:
    a fourth prism having fifth and sixth surfaces; a third spatial light modulator on the fifth surface, the third spatial light modulator facing in the first direction; and
    a third light source optically coupled to the sixth surface, the third light source configured to provide a third light having a third color along a third illumination path in the plane through the sixth surface to the third spatial light modulator, the third spatial light modulator configured to modulate the third light, the sixth surface configured to reflect the modulated third light from the third spatial light modulator, and the second dichroic layer configured to reflect the modulated third light from the sixth surface to the projection optics.

8. The projector of claim 7 further comprising:
a first folding prism optically coupled to receive the first light along the first illumination path and to direct the first light through the second surface;
a second folding prism optically coupled to receive the second light along the second illumination path and to direct the second light through the fourth surface; and
a third folding prism optically coupled to receive the third light along the third illumination path and to direct the third light through the sixth surface.

9. The projector of claim 1, wherein the first light source and the second light source are derived from a third light source.

10. The projector of claim 9, further comprising a dichroic mirror, in which the third light source is a white light source, and the first light source and the second light source are derived by reflection of the first light source off the dichroic mirror and transmission of the second light source through the dichroic mirror.

11. A projector comprising:
projection optics;
an X-prism having first and second dichroic layers;
a first prism having first and second surfaces; a first spatial light modulator on the first surface;
a first light source optically coupled to the second surface, the first light source configured to provide a first light having a first color along a first illumination path in a plane through the second surface to the first spatial light modulator, the first spatial light modulator configured to modulate the first light, the second surface configured to reflect the modulated first light from the first spatial light modulator, and the first dichroic layer configured to reflect the modulated first light from the second surface to the projection optics along a projection light path in the plane;
a second prism having third and fourth surfaces;
a second spatial light modulator on the third surface;
a second light source optically coupled to the fourth surface, the second light source configured to provide a second light having a second color along a second illumination path in the plane through the fourth surface to the second spatial light modulator, the second spatial light modulator configured to modulate the second light, the fourth surface configured to reflect the modulated second light from the second spatial light modulator, and the second dichroic layer configured to reflect the modulated second light from the fourth surface to the projection optics;
a third prism having fifth and sixth surfaces;
a third spatial light modulator on the fifth surface; and
a third light source optically coupled to the sixth surface, the third light source configured to provide a third light having a third color along a third illumination path in the plane through the sixth surface to the third spatial light modulator, the third spatial light modulator configured to modulate the third light, the sixth surface configured to reflect the modulated third light from the third spatial light modulator, and the first and second dichroic layers configured to pass the modulated third light from the sixth surface to the projection optics.

12. The projector of claim 11, further comprising:
a first folding prism optically coupled to receive the first light along the first illumination path and to direct the first light through the second surface;
a second folding prism optically coupled to receive the second light along the second illumination path and to direct the second light through the fourth surface; and
a third folding prism optically coupled to receive the third light along the third illumination path and to direct the third light through the sixth surface.

13. The projector of claim 11 wherein the modulated first light reflected off the second surface, the modulated second light reflected off the fourth surface and the modulated third light reflected off the sixth surface are reflected by total internal reflection.

14. The projector of claim 11, wherein the first spatial light modulator, the second spatial light modulator and the third spatial light modulator are digital micromirror devices.

15. The projector of claim 11, wherein the first color is red, the second color is blue, and the third color is green.

16. The projector of claim 11, wherein the third prism is inverted relative to the first and second prisms.

17. The projector of claim 16, wherein the first spatial modulator faces the first prism in a first direction, the second spatial modulator faces the second prism in the first direction, and the third spatial modulator faces the third prism in a second direction opposite the first direction.

18. The projector of claim 11, wherein the first light source, the second light source and the third light source are derived from a fourth light source.

19. The projector of claim 18 further comprising first and second dichroic mirrors, in which the fourth light source is a white light source, and the first, second and third light sources are derived by reflection of the fourth light source off the first dichroic mirror to provide the first light source, by reflection of the fourth light source off the second dichroic mirror to provide the second light source, and by transmission of the fourth light source through the first dichroic mirror and the second dichroic mirror to provide the third light source.

20. The projector of claim 11, wherein the first spatial modulator faces the first prism in a first direction, the second spatial modulator faces the second prism in the first direction, and the third spatial modulator faces the third prism in a second direction opposite the first direction.

* * * * *